United States Patent [19]

Rich

[11] Patent Number: 4,787,665

[45] Date of Patent: * Nov. 29, 1988

[54] AUTOMOTIVE ROOF SPOILER HAVING RETRACTABLE LAMPS

[75] Inventor: Lawrence D. Rich, New Baltimore, Mich.

[73] Assignee: Riverside International, Inc., Troy, Mich.

[*] Notice: The portion of the term of this patent subsequent to Nov. 17, 2004 has been disclaimed.

[21] Appl. No.: 107,071

[22] Filed: Oct. 13, 1987

Related U.S. Application Data

[63] Continuation-in-part of Ser. No. 930,833, Nov. 14, 1986, Pat. No. 4,707,014.

[51] Int. Cl.⁴ .................. B62D 35/00; B60Q 1/00
[52] U.S. Cl. .................. 296/180.1; 362/65; 362/66
[58] Field of Search .......... 296/1 S, 91; 362/65, 362/66

[56] References Cited

U.S. PATENT DOCUMENTS

| | | | |
|---|---|---|---|
| 2,312,005 | 2/1943 | Smith | 362/65 |
| 3,514,023 | 5/1970 | Russell et al. | 296/1 S |
| 3,761,890 | 9/1973 | Fritts et al. | 362/66 X |
| 4,171,846 | 10/1979 | Isleif et al. | 296/1 S |
| 4,259,660 | 3/1981 | Oliver | 362/66 X |
| 4,432,040 | 2/1984 | Matsura et al. | 362/66 X |
| 4,622,622 | 11/1986 | Baba | 362/66 X |
| 4,652,036 | 3/1987 | Okamoto et al. | 296/1 S |
| 4,707,014 | 11/1987 | Rich | 296/1 S |

Primary Examiner—Dennis H. Pedder
Attorney, Agent, or Firm—Cullen, Sloman, Cantor, Grauer, Scott & Rutherford

[57] ABSTRACT

An automotive roof spoiler having retractable lamps particularly suitable for trucks, vans, campers and other vehicles used for both on-road and off-road purposes. The automotive roof spoiler includes lamps which are rotatably mounted within the roof spoiler about axes generally parallel to the longitudinal axis of the spoiler and a motor, preferably located within the roof spoiler, which rotates the lamps from an upright position with the lenses of the lamps facing forwardly above the roof spoiler for off-road use to a retracted position within the body portion of the spoiler for on-road use.

9 Claims, 2 Drawing Sheets

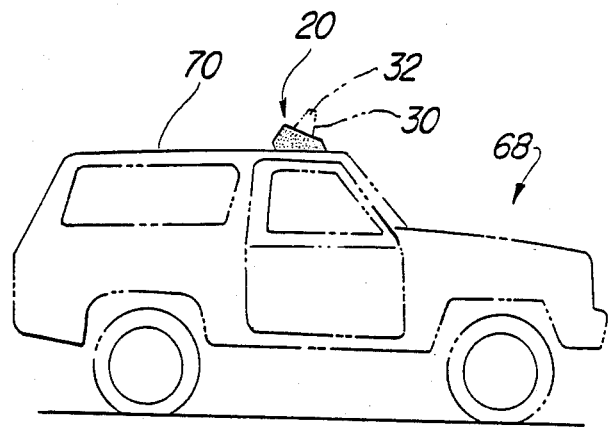
_Fig-5_
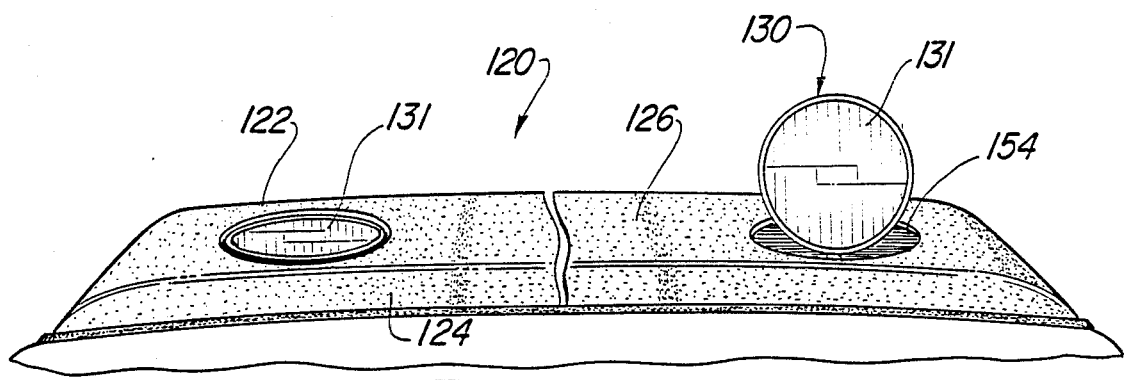
_Fig-6_
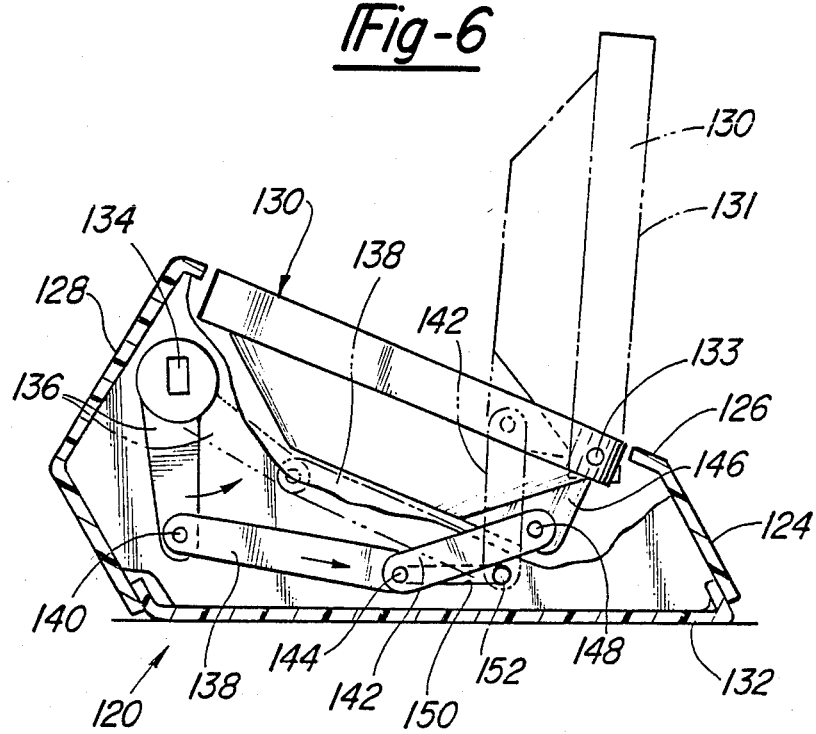
_Fig-7_

AUTOMOTIVE ROOF SPOILER HAVING RETRACTABLE LAMPS

RELATED APPLICATION

This application is a continuation-in-part application of copending application Ser. No. 930,833, filed Nov. 14, 1986, now U.S. Pat. No. 4,707,014.

BACKGROUND OF THE INVENTION

The present invention relates to automotive roof spoilers designed to reduce frictional air drag including one or more retractable lamps, wherein the lamps may be located in an upright position with the lens facing forwardly for off-road use and the lamps may be retracted for on-road use.

Automotive roof spoilers have been available for many years. The roof spoiler is generally mounted on the roof or cab of an automobile or truck to reduce the "drag" due to air friction as the car or truck moves forwardly by creating a laminar flow over the top of the vehicle. Roof spoilers may also be mounted on a camper top, light bar or the like. The roof spoiler may also create "lift", similar to the wing of an airplane. Spoilers are also used on the back or "trunk section" of a race car to increase traction and reduce fuel consumption. A roof spoiler mounted on the top of the vehicle may also reduce accumulation of road dirt or dust on the back window of the vehicle, such as the generally vertical rear window of a truck, which is particularly useful in off-road use where the vehicle travels over trails, dirt or gravel roads.

A roof spoiler preferably has an aerodynamic shape, wherein the cross-section of the roof spoiler is similar to the cross-section of an airplane wing and the forward or leading edge is generally V-shaped, including an upwardly inclined forward surface. The midportion of a roof spoiler may be spaced above the roof or cab surface of the vehicle to direct the air passing over the top of the vehicle generally parallel to the roof or cab surface, however, roof spoilers are also flush mounted on the roof or cab to direct the air passing over the top of the vehicle away from the rear window.

Roof mountable lamps and light bars are also available as an aftermarket item for off-road use. Many states, however, prohibit the use of roof-mounted lamps for on-road use, and several states require that such roof-mounted lamps be covered when the vehicle is used on a highway. The lamps are generally mounted to the roof or a light bar in a vertical position, increasing the frictional air drag of the vehicle. When the vehicle is used for both on-road and off-road use, the lamps must be repeatedly covered and uncovered manually, which often results in illegal or improper use, or the lamp may be accidentally uncovered during on-road use. Further, the lamps may be damaged or broken by stones which are thrown up during on-road use. It will be understood that roof-mounted lamps are particularly important in off-road use on trails and small dirt or gravel roads where the use of such lamps is permitted because of the need for intense illumination for safety purposes.

There is, therefore, a substantial need for retractable lamps, wherein the lamps may be rotated to an upright or generally vertical position for off-road use with the lenses facing forwardly and to a generally horizontal position, wherein the lamps are not functional, to reduce drag and wherein the lamps are protected from stones and other debris during on-road use. The automotive spoiler of this invention combines the advantages of a spoiler with a light bar, wherein the lamps may be rotated to an upright vertical position for off-road use or to a downward position within the spoiler for on-road use.

SUMMARY OF THE INVENTION

The automotive roof spoiler of this invention includes at least one retractable lamp, however, the preferred embodiment includes at least two spaced lamps to fully illuminate the area in front of the vehicle for off-road use. The roof spoiler includes an elongated body portion and means for mounting the spoiler body portion generally transversely to a longitudinal axis of the vehicle. As will be understood, the roof spoiler may be mounted directly on the roof or cab of an automobile or truck, preferably adjacent the upper extent of the vehicle. Alternatively, the roof spoiler may be mounted on other mounting means including, for example, a camper top, light bar, etc. or the spoiler may be made integral with a free-standing element such as a light bar at the forward portion of a truck bed.

The spoiler body portion includes a forward leading end or edge generally parallel to a longitudinal axis of the elongated body portion and a forward wall which is inclined upwardly and rearwardly from the leading end defining an air foil which reduces the frictional air drag of the vehicle. The body portion, preferably the forward inclined wall, includes at least one opening with a lamp having a lens mounted in the opening. The lamp is rotatably mounted on an axis generally parallel to the longitudinal axis of the body portion and the assembly includes a power means such as a motor which is adapted to rotate the lamp about the axis of rotation from an upright position with the lens facing forwardly for off-road use to a retracted position within the body portion for on-road use.

As described more fully in my above-referenced copending application, the body portion of the roof spoiler preferably includes a back wall and bottom wall defining an enclosure for the lamp or lamps. In the disclosed embodiment, the roof spoiler is mounted flush on the roof or support and may easily be secured to the support by fasteners which extend through the bottom wall of the roof spoiler into the cab or support. Two embodiments of the lamp assembly are disclosed herein, including a lamp which is rotatably mounted adjacent its rearward extent, wherein the power means rotates the lamp from the upright off-road position to the retracted position within the enclosure in a clockwise direction. In the alternative embodiment, the lamp is rotatably mounted adjacent its forward leading extent such that the lamp is rotated from the upright position to the retracted position in a counter clockwise direction. In either embodiment, the power means, such as a motor, may be mounted within the roof spoiler, preferably between the lamps where two lamps are utilized, as disclosed more fully in may above-referenced copending application. The rotation of the lamps may be controlled by a switch located within the passenger compartment or cab of the vehicle.

The automotive roof spoiler of this invention therefore provides the advantages of a conventional roof spoiler, including reduction of frictional air drag and the roof spoiler reduces the accumulation of dirt and dust on the vehicle back window. Further, the automotive roof spoiler of this invention includes retractable lamps wherein the lamps may be rotated to an upright position with the lenses of the lamps facing forwardly, preferably above the vehicle for off-road use, or the lamps may be rotated to a generally horizontal position within the body portion of the roof spoiler for on-road use.

Other advantages and meritorious features of the automotive roof spoiler of this invention will become more apparent from the following description of the preferred embodiments, the appended claims and the drawings, a brief description of which follows.

BRIEF DESCRIPTION OF THE DRAWINGS

FIGS. 3, 4 and 5 are side elevations of the roof spoiler shown in FIG. 1 illustrating alternative mountings for the roof spoiler on various vehicles;

FIG. 6 is a front elevation of a second embodiment of the roof spoiler of this invention; and FIG. 7 is a partially cross-sectioned side elevation of the embodiments shown in FIG. 6 illustrating a linkage for rotating the lamps in the embodiment shown in FIG. 6.

DETAILED DESCRIPTION OF THE PREFERRED EMBODIMENTS OF THE INVENTION

Figure 1:
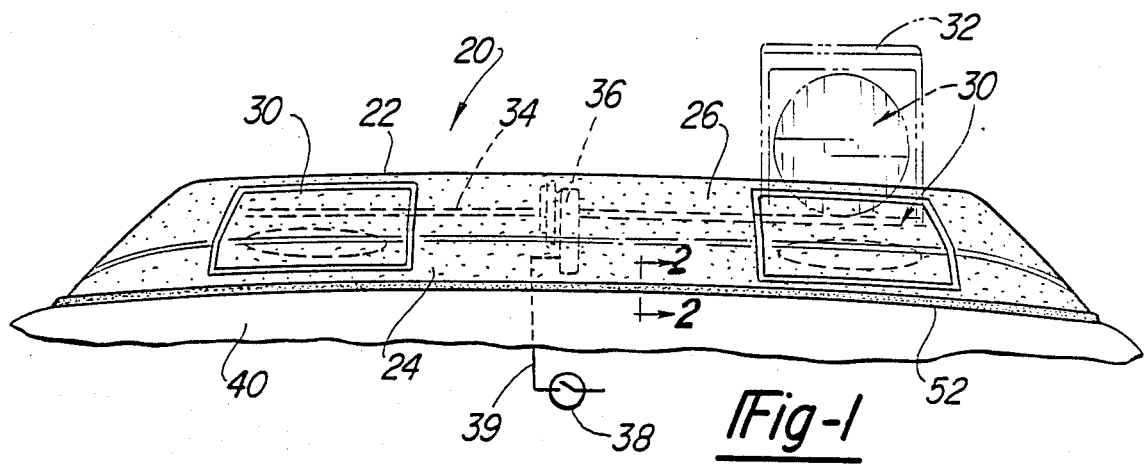
FIG. 1 is a front elevation of one embodiment of the roof spoiler of this invention illustrating the alternative positions of the lamps.
Figure 2:
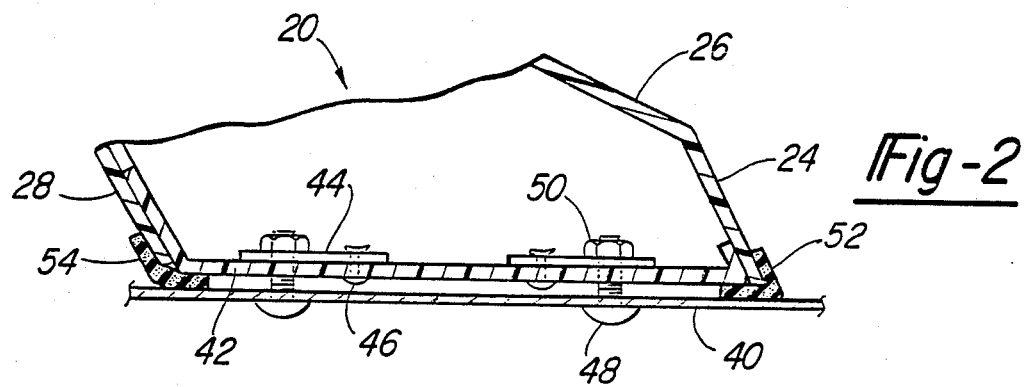
FIG. 2 is a partial side cross-sectional view of the embodiment of the roof spoiler shown in FIG. 1, in the direction of view arrows 2—2, illustrating a mounting of the roof spoiler.

The embodiment of the roof spoiler and lamp assembly 20 shown in FIGS. 1 and 2 is similar to the embodiment of the roof spoiler and lamp assembly shown in the above referenced copending application except that the roof spoiler is flush mounted. The disclosed embodiment of the roof spoiler includes an elongated body portion 22 which is mounted transversely to the longitudinal axis of the vehicle, preferably adjacent the upper extent of the vehicle for illuminating the road or trail in front of the vehicle. The preferred embodiment of the roof spoiler includes forward walls 24, 26 which are inclined upwardly and rearwardly from the forward end of the roof spoiler to reduce frictional air drag. As disclosed more fully in the above-identified copending application, the lamps 30 are pivotally mounted within the body portion 22 of the roof spoiler and the preferred embodiment includes a bracket and cover assembly 32 which supports the lamp during movement from the upright position shown in phantom in FIG. 1 to the closed or retracted position shown in solid lines. A shaft 34 is operably connected to a motor and speed reducer assembly 36, preferably located within the body portion 22 of the spoiler, and the lamp assembly 30. The disclosed embodiment of the automotive spoiler assembly 20 may be operated from within the passenger compartment or cab of the vehicle, wherein a switch 38 connected by line 39 to motor and speed assembly 36 may be open or closed to operate the motor 36.

As disclosed more fully in the above-identified copending application, the lamps 30 in the embodiment shown in FIGS. 1 and 2 are pivotally supported in the body portion 22 of the housing adjacent their rearward extent, such that the lamps are rotated in a clockwise direction by the motor and speed reducer assembly 36 and shaft 34 from the retracted or downward position shown by solid lines to the upright position shown in phantom with the lenses of the lamps preferably facing forwardly. In the retracted position, the lamps face downwardly.

As best shown in FIG. 2, the disclosed embodiment of the spoiler and lamp assembly 20 may be flush mounted on a support 40, such as the roof of a vehicle. The disclosed embodiment of the automotive spoiler includes a bottom wall 42 and metal bracket support plates 44 which are riveted as shown at 46 or otherwise attached to the bottom wall 42 of the spoiler. Metal bracket support plates 44 are used in the disclosed embodiment because the walls of the spoiler assembly are formed of plastic or polymeric material, such as vacuum-formed acrylonitrile butadiene-styrene (ABS). The bracket support plates 44 may then be bolted or otherwise attached to the support plate 40. In the disclosed embodiment, the bracket plates 44 are attached to the support panel 40 by bolts 48 and nuts 50. Because the disclosed embodiment of the spoiler assembly is flush-mounted on support panel 40, gasket pads 52, 54 are received between the leading and trailing edges, respectively, of the body portion to prevent damage to the roof or other support panel 40 and reduce vibrational noise.

Figure 3:
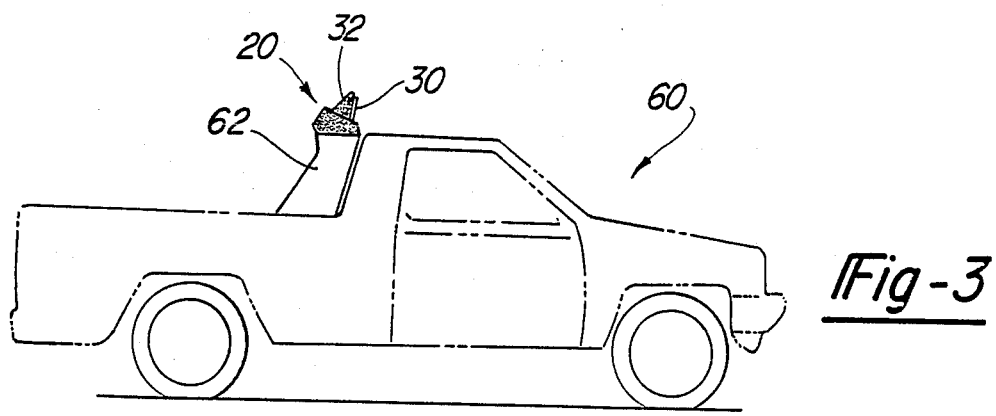
Figure 4:
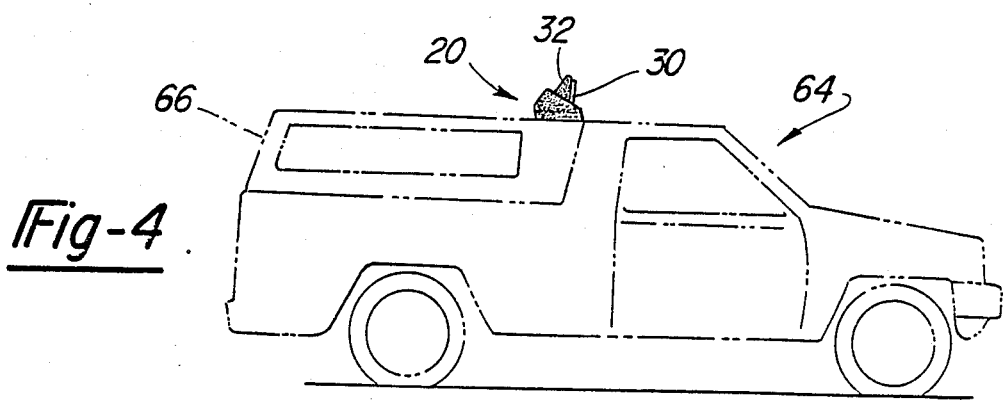

FIGS. 3 to 5 illustrate various ways the automotive roof spoiler and lamp assembly 20 of this invention may be mounted. FIG. 3 illustrates a conventional truck 60, such as a four-wheel-drive truck used for on-road and off-road purposes. In the embodiment disclosed in FIG. 3, the automotive roof spoiler and lamp assembly 20 is mounted on a light bar or roll-over bar 62. As will be understood, the roof spoiler 20 may be integral with the light bar 62 providing a unitary construction. In FIG. 4, the truck 64 includes a camper top 66 and the roof spoiler 20 is mounted on the forward or leading portion of the camper top. FIG. 5 illustrates a four-wheel-drive vehicle 68 commonly referred to as a "4×4" or "Jimmy". The spoiler 20 in FIG. 5 is mounted directly on the roof 70 of the vehicle. As best shown in FIGS. 3 to 5, the lens portion of the lamp 30 faces forwardly in the upright position for off-road use and the lamp may be retracted into the body portion of the spoiler for on-road use, wherein the aerodynamic shape of the spoiler reduces frictional air drag at the normally greater speeds associated with on-road use.

FIG. 6 illustrates a second embodiment of the automotive roof spoiler and lamp assembly 120 of this invention which is simpler in design, thereby reducing costs. As described above, the roof spoiler is preferably of an aerodynamic shape, wherein the front walls 124, 126 are inclined upwardly and rearwardly to reduce frictional air drag. In the disclosed embodiment, the body portion 122 of the spoiler defines an enclosure, including back wall 128 and bottom wall 132. In the embodiment of FIG. 6, however, the lamps 130 are pivotally supported adjacent their forward extent, such that the lamps are rotated in a clockwise direction from the retracted position shown by solid lines in FIG. 7 to the upright position shown in phantom.

As described above and in the above-referenced copending application, a motor or other power means (not shown) is connected to the lamp assemblies by a shaft 134. The shaft 134 is generally rectangular, as shown, the ends of which are received in a drive link 136. Counter clockwise rotation of the shaft 134 thus rotates drive link 136 in the same direction. In the disclosed embodiment, drive link 136 is connected to link 138 by pivot pin 140 and link 138 is connected to link 142 by pin 144. Finally, link 142 is connected to a flange 146 on the body portion of lamp 130 by pivot pin 148. When drive link 136 is rotated in a counter clockwise direction, as shown by the arrow, link 138 is moved forwardly and link 142 is rotated about pivot pin 144 to an upright position, as shown in phantom, rotating the lamp 130 in a clockwise direction to the upright position, as shown in phantom in FIG. 7, wherein the lens 131 preferably faces forwardly. As will be understood, the lamp 130 may then be rotated counter clockwise to the retracted position, shown by the solid lines in FIG. 7, by rotating shaft 134 in a clockwise direction. In the disclosed embodiment of FIG. 7, link 138 includes a drag link 150 having a cylindrical support stop 152 which supports link 142 in the downward or retracted position of the lamp 130 and guides link 142 to the upright position as shown in phantom.

As shown, the axis of rotation of the lamps, 133 in FIG. 7, is generally parallel to the longitudinal axis of the spoiler.

As best shown in FIG. 6, the lamps 130 are received through openings 154 in the body portion 122 of the spoiler, preferably in the forward wall 126. In the downward or retracted position, the lamps are received in the body portion 122 of the spoiler assembly with the lens 131 facing upwardly, preferably coplanar with the upper inclined wall 126 of the body portion. A cover, not shown, for the lens 131 may be optionally provided, although a cover is not necessary in the disclosed embodiment because of the aerodynamic shape of the spoiler and lamp assembly. In the upright position shown in the right hand portion of FIG. 6, the lens 131 of the lamp extends generally vertically in the upright position for off-road use. In the downward or retracted position, as shown on the left hand side of FIG. 6, the lens 131 is coplanar with the upper inclined wall 126 facing generally upwardly for on-road use.

As will be understood, various modifications may be made to the disclosed embodiment of the automotive roof spoiler and retractable lamp assembly of this invention without departing from the purview of the appended claims. As described above, the principal components of the spoiler defining the elongated body portion 22, 122, may be formed of any suitable material including various synthetic polymers, such as ABS, or metal. The motor and speed reducer assembly may be purchased from several sources, including the General Electric Company. The lamps 30, 130, are preferably high illumination lamps, such as halogen lamps, available from the Robert Bosch Corporation. As described, the automotive spoiler of this invention provides several important advantages over prior art roof-mounted lamps and combines the advantages of a roof spoiler with a light bar, wherein the lamps may be retracted and/or concealed within the roof spoiler for on-road use or rotated to an upright position for off-road use.

I claim:

1. An automotive roof spoiler having at least one retractable lamp, said roof spoiler having an elongated body portion, mounting means for mounting said spoiler body portion generally transversely to a longitudinal axis of a vehicle adjacent an upper extent of said vehicle, said body portion having a forward leading end generally parallel to a longitudinal axis of said elongated body portion, said body portion having a forwardly facing wall inclined upwardly and rearwardly defining an air foil surface reducing frictional air drag, said wall having an opening therethrough and a lamp assembly including a lamp having a lens mounted in said opening, said lamp assembly rotatably mounted about an axis generally parallel to said spoiler body portion longitudinal axis, and power means operably connected to said lamp assembly, said power means adapted to rotate said lamp assembly about said axis of rotation from an upright position with said lens of said lamp facing forwardly for off-road use to a retracted position within said spoiler body portion for on-road use, said lamp assembly having a surface generally coplanar with said inclined body portion wall when said lamp assembly is in said retracted position further reducing air drag of said roof spoiler.

2. The automotive roof spoiler defined in claim 1, characterized in that said lamp is rotatably mounted within said body portion adjacent the forward leading extent of said opening and said lamp is rotated by said power means from said upright position to said retracted position in a counter clockwise direction, wherein said lens of said lamp faces upwardly in said retracted position.

3. The automotive roof spoiler defined in claim 1, wherein said spoiler body portion includes a bottom wall mountable on said vehicle and said mounting means comprises fasteners extending through said bottom wall for attachment of said bottom wall of said body portion to an upper wall associated with said vehicle.

4. An automotive spoiler having retractable lamps, said spoiler having an enclosed elongated body portion, mounting means for mounting said spoiler body portion generally transversely to a longitudinal axis of a vehicle, said spoiler body portion including a forward facing wall inclined upwardly and rearwardly defining an air foil surface reducing frictional air drag of said spoiler and a rearward wall, said spoiler body portion having at least two spaced openings and a lamp assembly including a lamp having a lens portion mounted within each of said openings within said body portion, said lamp assemblies each rotatably mounted on an axis generally parallel to a longitudinal axis of said spoiler body portion, and power means operably connected to said lamp assemblies, said power means adapted to rotate said lamp assemblies about said axes of rotation from an upright position with said lenses of said lamps facing forwardly above said forward wall for off-road use to a retracted position within said body portion for on-road use, said lamp assemblies each having a surface generally coplanar with said inclined body portion wall generally closing said opening when said lamp assemblies are in said retracted position, further reducing air drag of said spoiler.

5. The automotive spoiler defined in claiam 4, characterized in that said lamps are rotatably mounted adjacent the forward leading extent of said openings and said lamps are rotated by said power means from said upright position to said retracted position within said body portion in a counter clockwise direction, wherein said lenses of said lamps face upwardly in said retracted position.

6. The automotive spoiler defined in claim 4, characterized in that said power means includes a motor located within said body portion and operably connected to said lamps by a shaft means.

7. The automotive spoiler defined in claim 4, wherein said spoiler body portion includes a bottom wall mountable on said vehicle and said spoiler including resilient mounting means adjacent forward and rearward edges of said body portion beneath said bottom wall.

8. The automotive roof spoiler defined in claim 2, characterized in that said lamp lens is generally co-planar with said inclined body portion wall when said lamp is in said retracted position.

9. The automotive spoiler defined in claim 5, characterized in that said lenses of said lamps are generally coplanar with said inclined body portion wall when said lamps are in said retracted position.

* * * * *